(12) United States Patent
Kondo et al.

(10) Patent No.: US 9,810,853 B2
(45) Date of Patent: Nov. 7, 2017

(54) OPTICAL RECEPTACLE, FERRULE, AND PLUG FERRULE

(71) Applicant: TOTO LTD., Kitakyushu-shi, Fukuoka (JP)

(72) Inventors: Sho Kondo, Fukuoka-Ken (JP); Hirotsugu Agatsuma, Fukuoka-Ken (JP); Satoshi Hakozaki, Fukuoka-Ken (JP); Satoshi Kaneyuki, Fukuoka-Ken (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 14/900,376

(22) PCT Filed: Jun. 27, 2014

(86) PCT No.: PCT/JP2014/067227
§ 371 (c)(1),
(2) Date: Dec. 21, 2015

(87) PCT Pub. No.: WO2014/208744
PCT Pub. Date: Dec. 31, 2014

(65) Prior Publication Data
US 2016/0161679 A1 Jun. 9, 2016

(30) Foreign Application Priority Data

Jun. 28, 2013 (JP) ................................. 2013-136497
Jun. 28, 2013 (JP) ................................. 2013-136498
(Continued)

(51) Int. Cl.
*G02B 6/38* (2006.01)
*G02B 6/26* (2006.01)

(52) U.S. Cl.
CPC ........... *G02B 6/3847* (2013.01); *G02B 6/262* (2013.01); *G02B 6/3825* (2013.01);
(Continued)

(58) Field of Classification Search
CPC ........ G02B 6/38; G02B 6/3874; G02B 6/3825
(Continued)

(56) References Cited

U.S. PATENT DOCUMENTS 5,097,522 A 3/1992 Tackett et al.
5,280,552 A 1/1994 Yokoi et al.
(Continued)

FOREIGN PATENT DOCUMENTS

JP 2001-066468 A 3/2001
JP 2004-354672 A 12/2004
(Continued)

*Primary Examiner* — Kaveh C Kianni
(74) *Attorney, Agent, or Firm* — Carrier Blackman & Associates, P.C.; Joseph P. Carrier; Fulchand P. Shende

(57) ABSTRACT

According to an aspect of the invention, an optical receptacle, comprising: a fiber stub including a ferrule containing an optical fiber conducting light; a holder holding the fiber stub; and a sleeve, one end of the sleeve being capable of holding a tip of the fiber stub, one other end of the sleeve being capable of holding a plug ferrule inserted into the optical receptacle, the ferrule including a foreign matter movement suppressor in an end surface of the ferrule, the end surface being polished into a convex spherical configuration on a side to be connected to the plug ferrule, the foreign matter movement suppressor suppressing movement of foreign matter moving, due to inserting and removing the plug ferrule, from an outer circumferential portion of the ferrule toward a central portion of the end surface. It is possible to prevent the loss occurring due to the foreign matter at the outer circumferential portion of the fiber stub moving to the central portion of the end surface of the ferrule when repeatedly inserting and removing the plug ferrule into and from the optical receptacle; and it is possible to reduce the Wiggle loss by maintaining the length where the sleeve holds the fiber stub.

9 Claims, 9 Drawing Sheets

(30) Foreign Application Priority Data

Mar. 7, 2014 (JP) .................. 2014-045650
May 2, 2014 (JP) .................. 2014-095241

(52) U.S. Cl.
CPC ......... *G02B 6/3846* (2013.01); *G02B 6/3863* (2013.01); *G02B 6/3866* (2013.01); *G02B 6/3874* (2013.01)

(58) Field of Classification Search
USPC .......................................... 385/60
See application file for complete search history.

(56) References Cited

U.S. PATENT DOCUMENTS

| | | | |
|---|---|---|---|
| 5,325,455 A | 6/1994 | Henson et al. | |
| 5,436,995 A | 7/1995 | Yoshizawa et al. | |
| 5,537,501 A | 7/1996 | Iwano et al. | |
| 5,673,346 A | 9/1997 | Iwano et al. | |
| 5,925,191 A * | 7/1999 | Stein et al. | 134/6 |
| 6,349,918 B1 | 2/2002 | Bunker | |
| 6,419,401 B1 * | 7/2002 | Taira et al. | 385/60 |
| 6,583,902 B1 | 6/2003 | Yuen | |
| 6,898,219 B2 | 5/2005 | Malone et al. | |
| 7,118,284 B2 | 10/2006 | Nakajima et al. | |
| 2002/0166190 A1 * | 11/2002 | Miyake et al. | 15/210.1 |
| 2003/0142917 A1 | 7/2003 | Merrick | |
| 2003/0152331 A1 | 8/2003 | Dair et al. | |
| 2003/0161586 A1 | 8/2003 | Hirabayashi | |
| 2003/0215191 A1 | 11/2003 | Taira et al. | |
| 2003/0228681 A1 | 12/2003 | Ritts et al. | |
| 2004/0037517 A1 | 2/2004 | Dair et al. | |
| 2004/0074661 A1 | 4/2004 | Schiaffino et al. | |
| 2004/0105625 A1 | 6/2004 | Ueda et al. | |
| 2005/0141817 A1 | 6/2005 | Yazaki et al. | |
| 2005/0180754 A1 | 8/2005 | Mizue et al. | |
| 2005/0220424 A1 | 10/2005 | Asano et al. | |
| 2005/0244109 A1 | 11/2005 | Yabe et al. | |
| 2005/0276547 A1 | 12/2005 | Wang et al. | |
| 2005/0286838 A1 | 12/2005 | Oki et al. | |
| 2005/0286839 A1 | 12/2005 | Yoshikawa | |
| 2006/0215970 A1 | 9/2006 | Mizue et al. | |
| 2007/0286554 A1 | 12/2007 | Kuffel et al. | |
| 2008/0175542 A1 | 7/2008 | Lu et al. | |
| 2009/0003772 A1 | 1/2009 | Lu et al. | |
| 2009/0148104 A1 | 6/2009 | Lu et al. | |
| 2009/0162016 A1 | 6/2009 | Lu et al. | |
| 2011/0047731 A1 | 3/2011 | Sugita et al. | |
| 2015/0331201 A1 * | 11/2015 | Takano et al. | 385/6 |

FOREIGN PATENT DOCUMENTS

| | | | |
|---|---|---|---|
| JP | 2005-099451 A | | 4/2005 |
| JP | 2005-134550 A | | 5/2005 |
| JP | 2005134550 A | * | 5/2005 |
| JP | 2009-151200 A | | 7/2009 |
| JP | 4570347 B2 | | 10/2010 |
| JP | 2013-088462 A | | 5/2013 |

* cited by examiner

|  | Ra | Rc | Rsk | FOREIGN MATTER COUNTERMEASURE EFFECT |
|---|---|---|---|---|
| #1 | 0.170 | 0.530 | -0.198 | ○ |
| #2 | 0.149 | 0.430 | -0.304 | ○ |
| #3 | 0.192 | 0.606 | -0.225 | ○ |
| #4 | 0.130 | 0.305 | -0.355 | ○ |
| #5 | 0.188 | 0.575 | -0.256 | ○ |
| Avg | 0.166 | 0.489 | -0.268 | |

FIG. 10A

|  | Ra | Rc | Rsk | FOREIGN MATTER COUNTERMEASURE EFFECT |
|---|---|---|---|---|
| #1 | 0.017 | 0.070 | 0.183 | × |
| #2 | 0.020 | 0.072 | -0.048 | × |
| #3 | 0.192 | 0.047 | -0.121 | × |
| #4 | 0.201 | 0.055 | 0.065 | × |
| #5 | 0.188 | 0.062 | -0.182 | × |
| Avg | 0.124 | 0.061 | -0.021 | |

FIG. 10B

|  | Ra | Rc | Rsk |
|---|---|---|---|
| #1 | 0.002 | 0.008 | 0.954 |
| #2 | 0.004 | 0.009 | 0.532 |
| Avg | 0.003 | 0.0085 | 0.743 |

FIG. 10C

|  | Ra | Rc | Rsk |
|---|---|---|---|
| UNPROCESSED SURFACE | 0.124 | 0.061 | -0.021 |
| PROCESSED SURFACE (ROUGH SURFACE) | 0.166 | 0.489 | -0.268 |
| POLISHED SURFACE | 0.003 | 0.0085 | 0.743 |

FIG. 10D

| Ra | PROCESSABILITY |
|---|---|
| 6.4 | × |
| 4.8 | × |
| 3.2 | ○ |
| 1.6 | ○ |
| 0.8 | ○ |
| 0.4 | △ |
| 0.2 | × |

# OPTICAL RECEPTACLE, FERRULE, AND PLUG FERRULE

TECHNICAL FIELD

Embodiments of the invention relate generally to an optical receptacle, a ferrule, and a plug ferrule

BACKGROUND ART

In an optical module of an optical communication transceiver, an optical receptacle is used as a component for optically connecting an optical fiber connector to an optical element such as a light receiving element, a light emitting element, etc. (e.g., referring to Patent Document 1). Also, in optical communication, there are cases where multiple optical fiber connectors are connected to each other via an adapter without using an optical receptacle.

While the basic characteristic of the optical receptacle is to optically connect the optical element to the optical fiber connector as described above, among the characteristics, loss generally called the Wiggle loss is one important characteristic in which a transverse load applied to an optical fiber connector inserted into an optical receptacle causes shifting between the central axes of the fiber stub inside the optical receptacle and the plug ferrule inside the optical fiber connector.

Also, when the plug ferrule is initially inserted into the optical module including the optical receptacle, normally, cleaning of the end surfaces of the optical receptacle and the plug ferrule that are to be connected to each other is performed to avoid loss when connecting and avoid external appearance problems due to scratches made in the fiber.

Although a method for blowing off the foreign matter by air blowing and a method for wiping the foreign matter of the end surface using a cloth-like member such as that of Patent Document 2 are generally known as cleaning methods of the end surface of the optical receptacle to be connected to the plug ferrule, it is difficult to remove the foreign matter completely from the end surface because the end surface is at a position secluded from the tip portion of the optical receptacle; and the foreign matter is merely moved to the outer circumferential portion where there is little optical effect when connecting the plug ferrule.

Therefore, conventional optical receptacles have the problem of loss occurring when connecting due to the foreign matter at the outer circumferential portion of the fiber stub inside the optical receptacle moving to the central portion of the fiber stub in the process of repeatedly inserting and removing the plug ferrule. This problem occurs even in the case where multiple optical fiber connectors are connected to each other via an adapter. In other words, in the process of repeatedly inserting and removing one plug ferrule into and from the adapter, there is a problem of loss occurring due to the foreign matter at the outer circumferential portion of one other plug ferrule inside the adapter moving to the central portion when connecting the one plug ferrule and the one other plug ferrule.

In the case where the optical receptacle is used, to solve the problem recited above, a structure may be considered in which a stepped part is provided in the tip portion of the fiber stub to prevent the foreign matter at the outer circumferential portion moving to the central portion of the fiber stub in the process of repeatedly inserting and removing the plug ferrule into and from the optical receptacle (e.g., referring to Patent Document 3).

However, although the effects described above are obtained by the structure recited in Patent Document 3, there is a problem of the Wiggle loss described above undesirably increasing due to shortening of the length where the sleeve inside the optical receptacle holds the fiber stub.

CITATION LIST

Patent Literature

[Patent Citation 1] JP 2001-66468 A (Kokai)
[Patent Citation 2] JP 2005-99451 A (Kokai)
[Patent Citation 3] JP 4570347

SUMMARY OF INVENTION

Technical Problem

To solve the problems recited above, an embodiment of the invention is directed to provide an optical receptacle in which the occurrence of the loss due to the foreign matter at the fiber stub outer circumferential portion or the plug ferrule outer circumferential portion moving to the central portion of the fiber stub end surface or the plug ferrule end surface when repeatedly inserting and removing the plug ferrule into and from the optical receptacle or the adapter can be prevented or in which the Wiggle loss can be reduced by maintaining the length where the sleeve holds the fiber stub.

Solution to Problem

According to an aspect of the invention, there is provided an optical receptacle, comprising a fiber stub including a ferrule containing an optical fiber conducting light; a holder holding the fiber stub; and a sleeve, one end of the sleeve being capable of holding a tip of the fiber stub, one other end of the sleeve being capable of holding a plug ferrule inserted into the optical receptacle, the ferrule including a foreign matter movement suppressor in an end surface of the ferrule, the end surface being polished into a convex spherical configuration on a side to be connected to the plug ferrule, the foreign matter movement suppressor suppressing movement of foreign matter moving, due to inserting and removing the plug ferrule, from an outer circumferential portion of the ferrule toward a central portion of the end surface.

BRIEF DESCRIPTION OF DRAWINGS

FIG. 10A to FIG. 10D are tables showing examples of the results of the investigations relating to the surface roughness implemented by the inventor.

DESCRIPTION OF EMBODIMENTS

Figure 1:
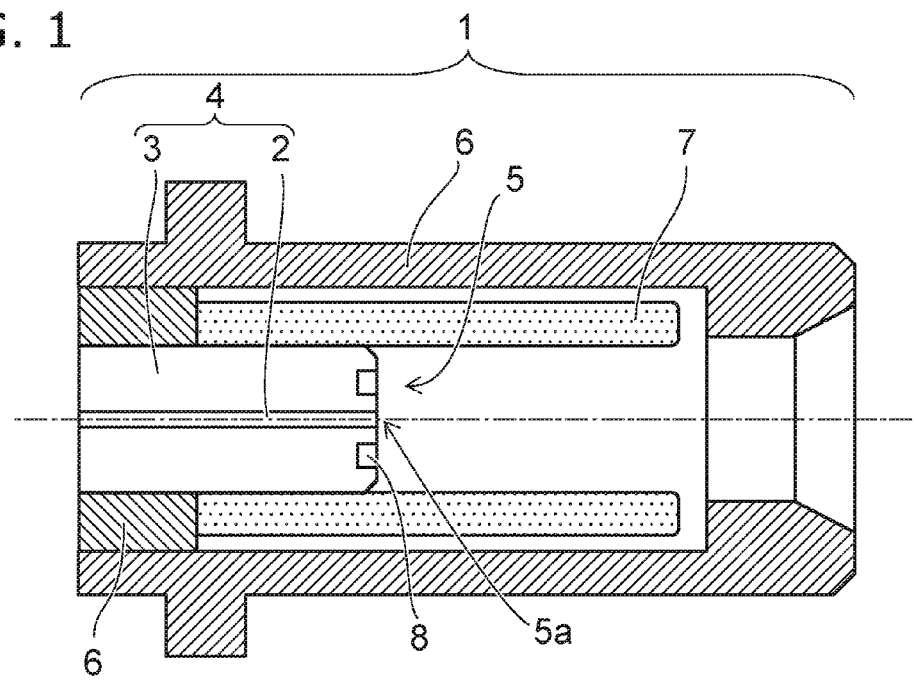
FIG. 1 is a schematic cross-sectional view of an optical receptacle showing a first embodiment of the invention.
Figure 2A:
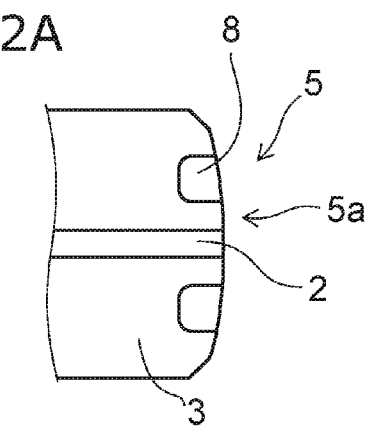
FIG. 2A to FIG. 2D are schematic cross-sectional views of recesses made in the end surface of the fiber stub polished into the convex spherical surface in the first embodiment of the invention.
Figure 2B:
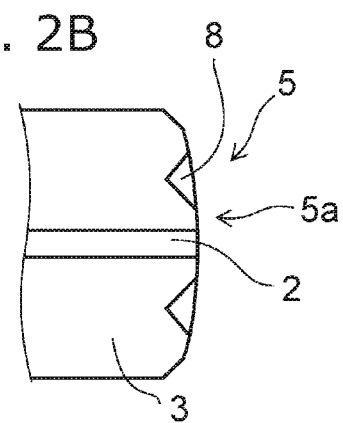
Figure 2C:
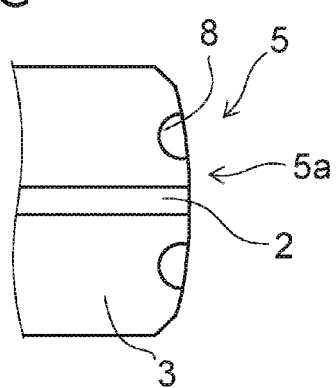
Figure 2D:
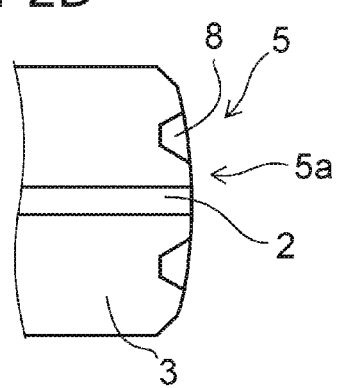

A first aspect of the invention is an optical receptacle, comprising a fiber stub including a ferrule containing an optical fiber conducting light; a holder holding the fiber stub; and a sleeve, one end of the sleeve being capable of holding a tip of the fiber stub, one other end of the sleeve being capable of holding a plug ferrule inserted into the optical receptacle, the ferrule including a foreign matter movement suppressor in an end surface of the ferrule, the end surface being polished into a convex spherical configuration on a side to be connected to the plug ferrule, the foreign matter movement suppressor suppressing movement of foreign matter moving, due to inserting and removing the plug ferrule, from an outer circumferential portion of the ferrule toward a central portion of the end surface.

According to the optical receptacle, it is possible to prevent the loss occurring due to the foreign matter at the outer circumferential portion of the fiber stub moving to the central portion of the end surface of the ferrule when repeatedly inserting and removing the plug ferrule into and from the optical receptacle; and it is possible to reduce the Wiggle loss by maintaining the length where the sleeve holds the fiber stub.

A second aspect of the invention is the optical receptacle according to the first aspect of the invention, wherein the foreign matter movement suppressor has a recess provided in the end surface, the recess extending in a circumferential configuration.

According to the optical receptacle, the foreign matter can be contained in the recess having the circumferential configuration.

A third aspect of the invention is the optical receptacle according to the second aspect of the invention, wherein the recess is outside a portion where the ferrule and the plug ferrule contact when the plug ferrule is inserted.

According to the optical receptacle, the recess having the circumferential configuration can suppress the obstruction of the connection between the fiber stub and the plug ferrule.

A fourth aspect of the invention is the optical receptacle according to the second aspect of the invention, wherein the recess is multiply provided.

According to the optical receptacle, the foreign matter can be contained with higher certainty in the recess having the circumferential configuration.

A fifth aspect of the invention is the optical receptacle according to the second aspect of the invention, wherein a surface roughness of an inner surface of the recess is larger than a surface roughness of a region other than the recess.

According to the optical receptacle, the foreign matter can be contained in the recess having the circumferential configuration; and the movement of the foreign matter moving toward the central portion of the end surface of the ferrule can be suppressed.

A sixth aspect of the invention is the optical receptacle according to the first aspect of the invention, wherein the foreign matter movement suppressor includes a first portion of the end surface of the ferrule on the side to be connected to the plug ferrule, the first portion not directly contacting the plug ferrule, and an average height of a surface of the first portion is 0.305 or more, and a skewness of the surface of the first portion is −0.2 or less.

According to the optical receptacle, the first portion that has the average height of 0.305 or more and has the skewness of −0.2 or less can trap the foreign matter and suppress the movement of the foreign matter.

A seventh aspect of the invention is the optical receptacle according to the sixth aspect of the invention, wherein at least a part of the first portion has a tapered configuration extending to an outer circumferential portion of the fiber stub.

According to the optical receptacle, the fiber stub can be easily pressed into the holder.

An eighth aspect of the invention is optical receptacle according to the sixth aspect of the invention, wherein a second portion of the end surface of the ferrule on the side to be connected to the plug ferrule protrudes further toward the side where the ferrule is connected to the plug ferrule than does the first portion, the second portion directly contacting the plug ferrule.

According to the optical receptacle, the movement of the foreign matter toward the central portion of the end surface of the ferrule can be suppressed with higher certainty.

A ninth aspect of the invention is the optical receptacle according to the eighth aspect of the invention, wherein a distance between an end surface of the second portion and a portion where the second portion is connected to the first portion is 0.2 millimeters or less.

According to the optical receptacle, the movement of the foreign matter toward the central portion of the end surface of the ferrule can be suppressed; and the anti-Wiggle performance can be ensured.

A tenth aspect of the invention is a ferrule containing an optical fiber conducting light, the ferrule including a foreign matter movement suppressor in an end surface, the end surface being polished into a convex spherical configuration on a side to be connected to one other member, the foreign matter movement suppressor suppressing movement of foreign matter moving, due to inserting and removing the ferrule, from an outer circumferential portion of the ferrule toward a central portion of the end surface.

According to the ferrule, the loss occurring due to the foreign matter at the outer circumferential portion of the ferrule moving to the central portion of the end surface of the ferrule can be prevented when repeatedly inserting and removing the ferrule into and from, for example, an adapter, a sleeve, etc.

An eleventh aspect of the invention is the ferrule according to the tenth aspect of the invention, wherein the foreign matter movement suppressor has a recess provided in the end surface, the recess extending in a circumferential configuration.

According to the ferrule, the foreign matter can be contained in the recess having the circumferential configuration.

A twelfth aspect of the invention is the ferrule according to the eleventh aspect of the invention, wherein the recess is outside a portion contacting the one other member.

According to the ferrule, the recess having the circumferential configuration can suppress the obstruction of the connection between the ferrule and the one other member.

A thirteenth aspect of the invention is the ferrule according to the eleventh aspect of the invention, wherein the recess is multiply provided.

According to the ferrule, the foreign matter can be contained with higher certainty in the recess having the circumferential configuration.

A fourteenth aspect of the invention is the ferrule according to the eleventh aspect of the invention, wherein a surface roughness of an inner surface of the recess is larger than a surface roughness of a region other than the recess.

According to the ferrule, the foreign matter can be contained in the recess having the circumferential configuration; and the movement of the foreign matter moving toward the central portion of the end surface of the ferrule can be suppressed.

A fifteenth aspect of the invention is the ferrule according to the tenth aspect of the invention, wherein the foreign matter movement suppressor includes a first portion of the end surface not directly contacting the one other member, and an average height of a surface of the first portion is 0.305 or more, and a skewness of the surface of the first portion is −0.2 or less.

According to the ferrule, the first portion having the average height of 0.305 or more and having the skewness of −0.2 or less can trap the foreign matter and suppress the movement of the foreign matter.

A sixteenth aspect of the invention is the ferrule according to the fifteenth aspect of the invention, wherein at least a part of the first portion has a tapered configuration extending to an outer circumferential portion of the one other member.

According to the ferrule, the ferrule can be easily pressed into, for example, an adapter, a sleeve, etc.

A seventeenth aspect of the invention is the ferrule according to the fifteenth aspect of the invention, wherein a second portion of the end surface protrudes further toward the side to be connected to the one other member than does the first portion, the second portion directly contacting the one other member.

According to the ferrule, the movement of the foreign matter toward the central portion of the end surface of the ferrule can be suppressed with higher certainty.

An eighteenth aspect of the invention is a plug ferrule, comprising: a ferrule containing an optical fiber conducting light, the ferrule including a foreign matter movement suppressor in an end surface of the ferrule, the end surface being polished into a convex spherical configuration on a side to be connected to one other member, the foreign matter movement suppressor suppressing movement of foreign matter moving, due to inserting and removing the ferrule, from an outer circumferential portion of the ferrule toward a central portion of the end surface; and a flange containing at least a part of the ferrule.

According to the plug ferrule, the loss occurring due to the foreign matter at the outer circumferential portion of the ferrule moving to the central portion of the end surface of the ferrule can be prevented when repeatedly inserting and removing the plug ferrule into and from, for example, an adapter, a sleeve, etc. Also, the adhesion of the fine debris to the polished end surface can be suppressed even when repeatedly inserting and removing the plug ferrule.

Embodiments of the invention will now be illustrated with reference to the drawings. Similar components in the drawings are marked with the same reference numerals, and a detailed description is omitted as appropriate.

FIG. 1 is a schematic cross-sectional view of an optical receptacle showing a first embodiment of the invention.

The optical receptacle 1 includes a fiber stub 4 that includes a ferrule 3 containing an optical fiber 2 for conducting light, a holder 6 for holding the fiber stub 4, and a sleeve 7 that has one end that is capable of holding a tip of the fiber stub 4 and one other end that is capable of holding a plug ferrule (one other member) inserted into the optical receptacle 1. A recess (a foreign matter movement suppressor) 8 that extends in a circumferential configuration and is for containing foreign matter moving, due to inserting and removing the plug ferrule, from the outer circumferential portion of the ferrule 3 toward the central portion of the ferrule 3 is provided in an end surface 5 of the ferrule 3 on the side to be connected to the plug ferrule. The plug ferrule that is inserted into the optical receptacle 1 is omitted as appropriate.

Although materials suited to the ferrule 3 include a ceramic, glass, etc., a zirconia ceramic is used in the example; the optical fiber 2 is fixedly adhered inside a through-hole made in the central portion of the ferrule 3; and the end surface 5 is formed by polishing one end optically connected to the plug ferrule to be a convex spherical surface having a curvature radius R of R7 to R25. Also, the fiber stub 4 is pressed into the holder 6 and fixed by the holder 6 in the assembly of the optical receptacle 1.

Although materials suited to the sleeve 7 include a resin, a metal, a ceramic, etc., a split sleeve made of a zirconia ceramic having a slit in the total length direction was used in the example. At the one end, the sleeve 7 can hold the tip portion of the fiber stub 4 polished into the convex spherical surface; and at the one other end, the sleeve 7 can hold the plug ferrule inserted into the optical receptacle 1.

Normally, cleaning of the end surface 5 having the convex spherical configuration of the fiber stub 4 is performed prior to the first insertion of the plug ferrule into the optical receptacle 1 to prevent loss from occurring and prevent scratches being made due to the existence of foreign matter on the fiber core of the fiber stub 4 inside the plug ferrule and the optical receptacle 1. However, because the end surface 5 of the fiber stub 4 having the convex spherical configuration where the plug ferrule is to be connected exists at a secluded position covered with the sleeve 7 and/or the holder 6, it is difficult to completely remove the foreign matter at the end surface 5 from the interior of the optical receptacle 1; and the foreign matter at the end surface 5 moves to the outer circumferential portion of the end surface 5 having the convex spherical configuration.

Also, when the end surface 5 of the fiber stub 4 having the convex spherical configuration to be connected to the plug ferrule is cleaned, the end surface 5 is charged by friction with air due to air blowing, etc. Therefore, because the close adhesion occurs more at the central portion including the optical fiber 2 than at the outer circumferential portion of the fiber stub 4 when the plug ferrule is connected to the fiber stub 4, an electric field from the outer circumferential portion toward the central portion is generated between the plug ferrule and the fiber stub 4.

Also, the foreign matter that exists at the outer circumferential portion of the end surface 5 having the convex spherical configuration of the fiber stub 4 is charged by the cleaning, etc. Therefore, the foreign matter described above is attracted and moved from the outer circumferential portion toward the central portion due to the electric field generated by the connection between the plug ferrule and the fiber stub 4. Then, loss occurs due to the foreign matter adhering on the core of the optical fiber 2 at the center of the end surface 5 having the convex spherical configuration of the fiber stub 4.

Conversely, in the first embodiment of the invention shown in FIG. 1, because the recess 8 for containing the foreign matter is provided on the end surface 5 of the fiber stub 4 having the convex spherical configuration to be connected to the plug ferrule, the loss due to the foreign matter that was adhered to the outer circumferential portion of the fiber stub 4 moving to a central portion 5a in the process of repeatedly inserting and removing the plug ferrule into and from the optical receptacle 1 can be prevented.

Also, when a transverse load is applied to the plug ferrule in the state in which the plug ferrule is inserted into the optical receptacle 1, shifting from the fiber stub 4 occurs between the central axes due to the tilt of the plug ferrule; and Wiggle loss occurs. At this time, in the case where the length where the sleeve 7 holds the fiber stub 4 at the one end is short, the shifting from the fiber stub 4 between the central axes due to the tilt of the plug ferrule becomes larger; and the Wiggle loss increases.

Conversely, in the first embodiment of the invention shown in FIG. 1, because the length where the sleeve 7 holds the fiber stub 4 is ensured sufficiently, the Wiggle loss can be suppressed.

Because the recess 8 extends in the circumferential configuration, the foreign matter can be contained reliably and the occurrence of the loss can be prevented even in the case where the foreign matter moves to the central portion 5a from any direction of the outer circumferential portion of the fiber stub 4.

It is desirable for the width and depth of the recess 8 to be 0.1 mm or more to reliably contain the foreign matter.

FIG. 2 is a schematic cross-sectional view of recesses made in the end surface of the fiber stub polished into the convex spherical surface in the first embodiment of the invention.

It is possible for the recess 8 to contain the foreign matter if the recess 8 has a width and a depth not less than constant values. However, to provide the recess 8 efficiently and economically in the end surface 5 of the fiber stub 4, it is desirable for the cross-sectional view of the recess 8 to be a quadrilateral, a V-shape, a semicircle, or various shapes in which the width becomes finer toward the bottom surface as in FIG. 2A to FIG. 2D.

Figure 3:
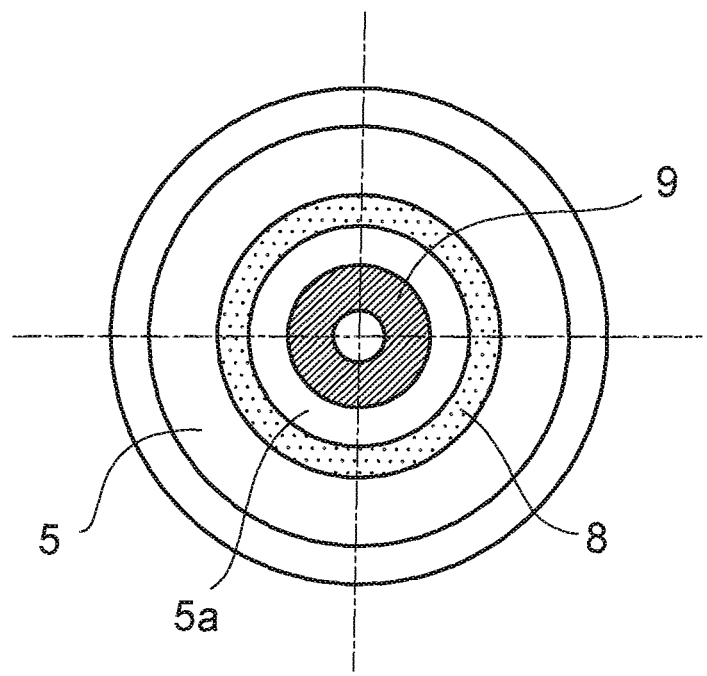
FIG. 3 is a schematic view of the end surface of the fiber stub of the optical receptacle to be connected to the plug ferrule showing a second embodiment of the invention.

FIG. 3 is a schematic view of the end surface of the fiber stub of the optical receptacle to be connected to the plug ferrule showing a second embodiment of the invention.

Normally, when the plug ferrule is connected to the optical receptacle 1, the plug ferrule is pressed to the fiber stub 4 at a constant load by a spring provided at the rear end of the plug ferrule. The load of the spring pressing the plug ferrule to the fiber stub 4 is determined by international standards such as IEC, etc.; and the plug ferrule and the end surface 5 of the fiber stub 4 are set to be connected reliably if both similarly satisfy the configurations determined by international standards.

In the second embodiment of the invention, the recess 8 that extends in the circumferential configuration is formed outside a region 9 where there is a possibility of the plug ferrule and the fiber stub 4 contacting when the plug ferrule is inserted into the optical receptacle 1. Thereby, the plug ferrule and the fiber stub 4 are connected reliably because the foreign matter at the outer circumferential portion of the fiber stub 4 is prevented from moving to the region 9 of the end surface 5 of the fiber stub 4 to be connected to the plug ferrule when repeatedly inserting and removing the plug ferrule into and from the optical receptacle 1.

Here, the region 9 where there is a possibility of the plug ferrule and the fiber stub 4 contacting when the plug ferrule is inserted into the optical receptacle 1 is a region within ϕ250 micrometers from the central portion of the fiber stub 4.

Figure 4:
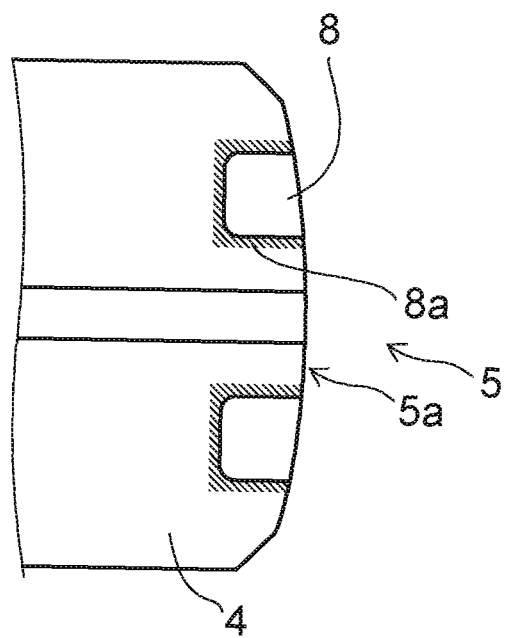
FIG. 4 is a schematic cross-sectional view of the recess made in the fiber stub end surface in a third embodiment of the invention.

FIG. 4 is a schematic cross-sectional view of the recess made in the fiber stub end surface in a third embodiment of the invention.

By setting the surface roughness of the inner surface of the recess 8 to be larger than the surface roughness of the region of the end surface 5 of the ferrule 3 other than the recess 8, it is possible to contain with higher certainty the foreign matter inside the recess 8 by providing, in the process of repeatedly inserting and removing the plug ferrule into and from the optical receptacle 1, an anchor effect due to the entire foreign matter or a part of the foreign matter falling into the recess 8 and engaging a micro unevenness 8a formed in the inner surface of the recess 8.

Here, considering the processability, it is desirable for the surface roughness of the inner surface of the recess to have an arithmetic average roughness (Ra) of about 0.8 micrometers to 3.2 micrometers. In the case where the arithmetic average roughness is 3.2 micrometers or more, there is a possibility that a large stress may be applied to the ferrule 3 in the processing to form the recess (the trench) 8 provided in the end surface 5 of the ferrule 3; and cracks having the micro unevenness 8a provided inside the recess 8 as starting points may occur in the ferrule 3. For example, the surface roughness of the recess 8 can be measured by a laser microscope, etc. Details of the surface roughness of the inner surface of the recess 8 are described below.

As methods for forming the micro unevenness 8a in the inner surface of the recess 8, a method for using a grindstone having a rough surface in the processing to form the recess 8, methods such as making the recess rough by sandblasting, etc., after making the recess, etc., may be considered.

Figure 5:
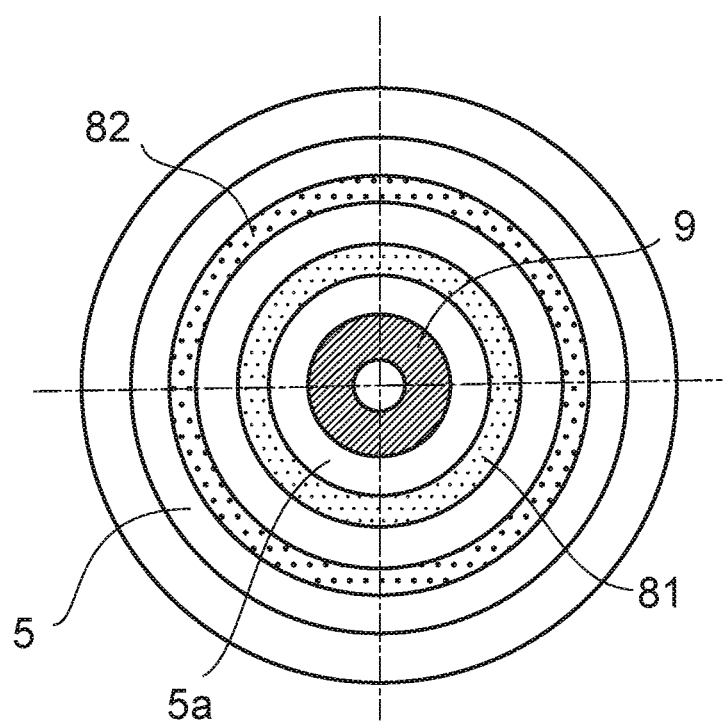
FIG. 5 is a schematic view showing the state of the end surface of the fiber stub on the side to be connected to the plug ferrule showing a fourth embodiment of the invention.

FIG. 5 is a schematic view showing the state of the end surface of the fiber stub on the side to be connected to the plug ferrule showing a fourth embodiment of the invention.

By providing the recess extending in multiple circumferential configurations in the end surface 5 of the fiber stub 4, the foreign matter that moves from the outer circumferential portion of the fiber stub 4 to the central portion in the process of repeatedly inserting and removing the plug ferrule into and from the optical receptacle 1 can be contained with higher certainty. It is unnecessary for the width, the depth, and the cross-sectional configuration to be the same for a first recess 81 on the inner circumferential side and a second recess 82 on the outer circumferential side.

FIG. 6 is a schematic cross-sectional view of an optical receptacle showing a fifth embodiment of the invention.

Figure 6A:
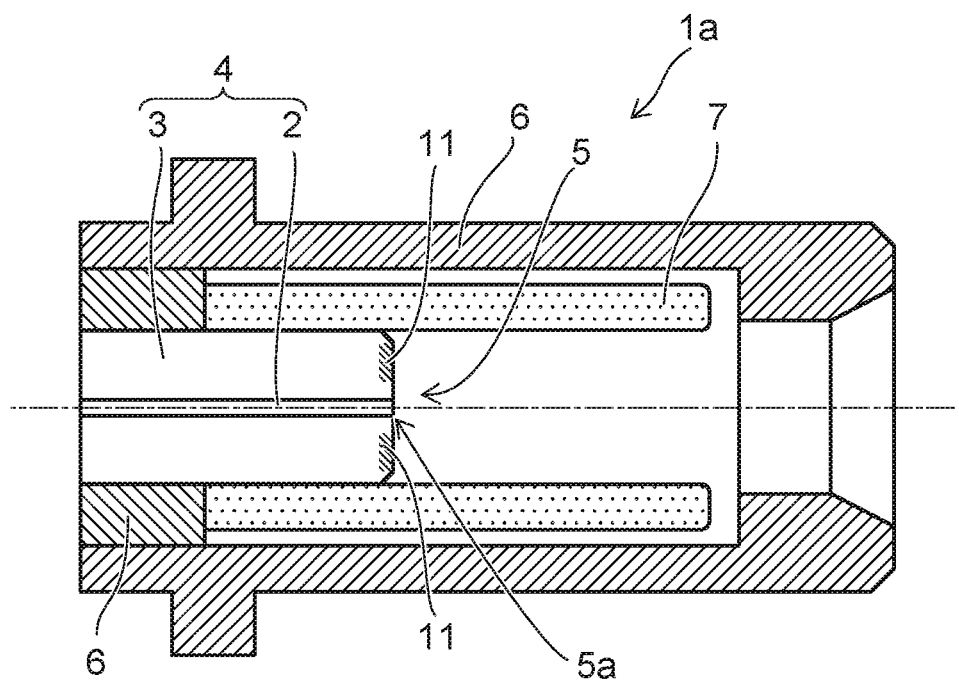
FIG. 6A and FIG. 6B are schematic cross-sectional views of an optical receptacle showing a fifth embodiment of the invention.
Figure 6B:
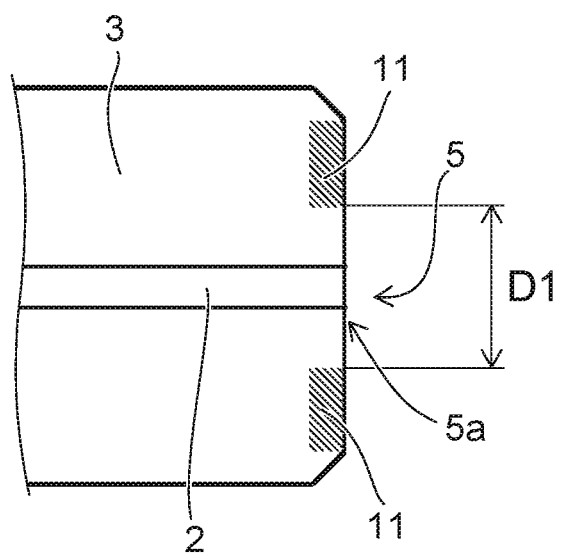

FIG. 6A is a schematic cross-sectional view showing the optical receptacle according to the embodiment. FIG. 6B is a schematic cross-sectional view showing the end surface of the fiber stub of the embodiment.

The members included in the optical receptacle is shown in FIG. 6A are similar to those of the first embodiment. The central portion 5a of the end surface 5 of the fiber stub 4 on the side to be connected to the plug ferrule is polished into a convex spherical configuration. The curvature radius of the convex spherical surface is R7 to R25. An outer unit (foreign matter movement suppressor: first portion) 11 is provided in the end surface 5 of the fiber stub at the outer side of the central portion 5a polished into the convex spherical configuration. The surface roughness of the outer unit 11 is set to be larger than the surface roughness of the central portion 5a to suppress movement of the foreign matter moving from the outer circumferential portion side toward the central portion 5a. The plug ferrule to be inserted into the optical receptacle is omitted as appropriate.

An average height Rc of the outer unit 11 is 0.305 or more. More desirably, the average height Rc of the outer unit 11 is not less than 0.305 and not more than 0.606.

A skewness (skewness) Rsk of the outer unit 11 is −0.2 or less. More desirably, the skewness Rsk of the outer unit 11 is −0.3 or less.

The average height Rc and the skewness Rsk are calculated based on JIS B 0601-2001. Details of more specific measurement methods of the average height Rc and the skewness Rsk are described below.

In the embodiment, the central portion 5a of the end surface 5 of the fiber stub 4 on the side to be connected to the plug ferrule is polished into a convex spherical configuration. The outer unit 11 is provided in the end surface 5 of the fiber stub 4 on the outer side of the central portion 5a polished into the convex spherical configuration. The surface roughness of the outer unit 11 is set to be larger than the surface roughness of the central portion 5a to suppress movement of the foreign matter moving from the outer circumferential portion side toward the central portion 5a. Therefore, the loss occurring due to the foreign matter that was adhered to the outer circumferential portion of the fiber stub 4 moving to the central portion 5a in the process of repeatedly inserting and removing the ferrule 3 into and from the optical receptacle 1a can be prevented.

Also, in the embodiment, because the length where the sleeve 7 holds the fiber stub 4 is ensured sufficiently, the Wiggle loss can be suppressed.

The materials of the members, etc., and the other structures of the optical receptacle 1a are as described above in reference to FIG. 1.

The outer unit 11 is formed outside the region 9 (referring to FIG. 3 or FIG. 5) where there is a possibility of the plug ferrule and the fiber stub 4 contacting when the plug ferrule is inserted into the optical receptacle 1a. Thereby, the plug ferrule and the fiber stub 4 are connected reliably because the foreign matter at the outer circumferential portion of the fiber stub 4 is prevented from moving to the region 9 of the end surface 5 of the fiber stub 4 to be connected to the plug ferrule when repeatedly inserting and removing the plug ferrule into and from the optical receptacle 1a.

The region 9 where there is a possibility of the plug ferrule and the fiber stub 4 contacting when the plug ferrule is inserted into the optical receptacle 1a is the region (the region having an outer diameter D1 shown in FIG. 6B) within φ250 micrometers from the central portion of the fiber stub 4. Therefore, in the embodiment, it is necessary for the outer diameter of the end surface 5 to be 250 micrometers or more to connect the end surface 5 having the convex spherical configuration reliably to the plug ferrule.

Also, generally, the surface roughness of the central portion 5a polished into the convex spherical configuration has an arithmetic average roughness (Ra) of 0.1 micrometers or less.

By setting the surface roughness of the outer unit 11 to be larger than the roughness of the central portion 5a, the foreign matter moving from the outer circumferential portion of the ferrule 3 to the central portion 5a of the ferrule 3 when repeatedly inserting and removing the plug ferrule into and from the optical receptacle 1a engages the micro unevenness due to the anchor effect; and the loss can be prevented from occurring by suppressing the movement of the foreign matter.

It is desirable for the surface roughness of the outer unit 11 to have an arithmetic average roughness (Ra) of about 3.2 micrometers or less to reliably hold the foreign matter and be produced economically. In the case where the arithmetic average roughness is 3.2 micrometers or more, there is a possibility that a large stress may be applied to the ferrule 3 and cracks and chipping may occur in the ferrule 3 from the starting points of the end portions of the micro unevenness at the outer unit 11 in the processing to form the outer unit 11. For example, the surface roughness of the outer unit 11 can be measured by a laser microscope, etc.

Also, as methods for forming the micro unevenness in the outer unit 11, a method for forming by processing using a grindstone having a rough surface, a method such as making the surface rough by sandblasting after forming the taper, etc., may be considered.

FIG. 7 is a schematic cross-sectional view of an optical receptacle showing a sixth embodiment of the invention.

Figure 7A:
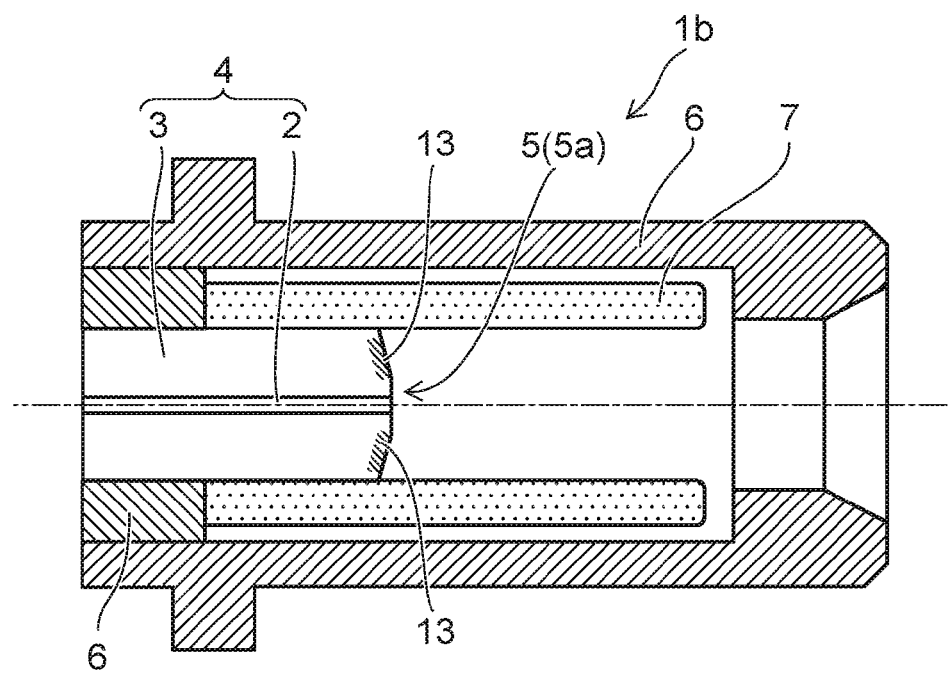
FIG. 7A and FIG. 7B are schematic cross-sectional views of an optical receptacle showing a sixth embodiment of the invention.
Figure 7B:
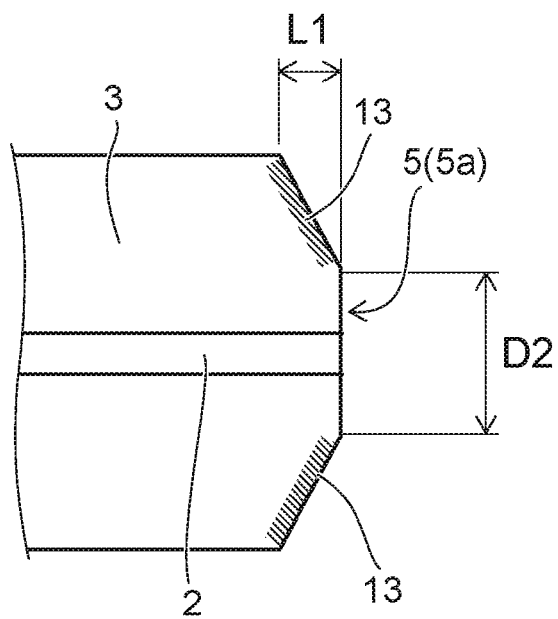

FIG. 7A is a schematic cross-sectional view showing the optical receptacle according to the embodiment. FIG. 7B is a schematic cross-sectional view showing the end surface of the fiber stub of the embodiment.

The members included in the optical receptacle 1b shown in FIG. 7A are similar to those of the first embodiment. The central portion 5a of the end surface of the fiber stub on the side to be connected to the plug ferrule is polished into a convex spherical configuration; the end surface of the fiber stub includes a tapered unit (foreign matter movement suppressor: first portion) 13 extending from the central portion 5a polished into the convex spherical configuration to the outer circumferential portion of the fiber stub; and the surface roughness of the tapered unit 13 is set to be larger than the surface roughness of the central portion 5a to suppress movement of the foreign matter moving from the outer circumferential portion side toward the central portion 5a. The plug ferrule to be inserted into the optical receptacle is omitted as appropriate.

The average height Rc of the tapered unit 13 is 0.305 or more. More desirably, the average height Rc of the tapered unit 13 is not less than 0.305 and not more than 0.606.

The skewness (skewness) Rsk of the tapered unit 13 is −0.2 or less. More desirably, the skewness Rsk of the tapered unit 13 is −0.3 or less.

The average height Rc and the skewness Rsk are calculated based on JIS B 0601-2001. Details of more specific measurement methods of the average height Rc and the skewness Rsk are described below.

In the sixth embodiment of the invention shown in FIG. 7, the end surface 5 of the fiber stub 4 on the side to be connected to the plug ferrule is polished into a convex spherical configuration; the end surface of the fiber stub 4 includes the tapered unit 13 extending from the central portion 5a polished into the convex spherical configuration to the outer circumferential portion of the fiber stub 4; the surface roughness of the tapered unit 13 is set to be larger than the surface roughness of the central portion 5a to suppress the movement of the foreign matter moving from the outer circumferential portion side toward the central portion; and therefore, the loss occurring due to the foreign matter that was adhered to the outer circumferential portion of the fiber stub 4 moving to the central portion 5a in the process of repeatedly inserting and removing the ferrule 3 into and from the optical receptacle 1b can be prevented. In the embodiment, the end surface 5 of the fiber stub 4 is equivalent to the central portion 5a.

In the sixth embodiment of the invention shown in FIG. 7, the Wiggle loss can be suppressed because the length where the sleeve 7 holds the fiber stub 4 is ensured sufficiently.

The sixth embodiment of the invention will now be described in detail using FIG. 7B. FIG. 7B is an enlarged schematic cross-sectional view of the fiber stub tip portion of the sixth embodiment of the invention.

In the sixth embodiment of the invention, an outer diameter D2 of the end surface 5 necessary for connecting the end surface 5 having the convex spherical configuration reliably to the plug ferrule is 250 micrometers or more.

Also, generally, the surface roughness of the end surface 5 polished into the convex spherical configuration has an arithmetic roughness average (Ra) of 0.1 micrometers or less.

By setting the surface roughness of the flat surface (the tapered unit) 13 having the tapered configuration to be larger than that of the end surface 5, the loss can be prevented from occurring by suppressing the movement of the foreign matter by causing the foreign matter moving from the outer circumferential portion of the ferrule 3 to the central portion 5a of the ferrule 3 when repeatedly inserting and removing the plug ferrule into and from the optical receptacle 1b to engage with the micro unevenness due to the anchor effect.

Here, by reducing the end surface 5, the effect of suppressing the movement of the foreign matter moving from the outer circumferential portion side to the central portion 5a when repeatedly inserting and removing the plug ferrule into and from the optical receptacle 1b can be increased at the tapered unit 13 having the surface roughness set to be larger than the roughness of the end surface 5. Therefore, it is desirable for the outer diameter D2 of the end surface 5 to be not less than 250 micrometers and not more than ½ of the outer diameter of the ferrule 3.

To reliably hold the foreign matter and be produced economically, it is desirable for the surface roughness of the flat surface 13 having the tapered configuration to have an arithmetic average roughness (Ra) of about 3.2 micrometers. In the case where the arithmetic roughness average is 3.2 micrometers or more, there is a possibility that a large stress may be applied to the ferrule 3 in the processing to form the flat surface 13 having the tapered configuration; and cracks and chipping of the ferrule 3 may occur from the starting points of the end portions of the micro unevenness at the flat surface 13 having the tapered configuration. For example, the surface roughness of the flat surface 13 having the tapered configuration can be measured by a laser microscope, etc.

Also, as methods for forming the micro unevenness in the flat surface 13 having the tapered configuration, a method for forming by processing using a grindstone having a rough surface, methods such as making the surface rough by sandblasting after forming the taper, etc., may be considered.

Also, it is desirable for a length L1 from the end surface 5 having the convex spherical configuration of the ferrule 3 to be connected to the plug ferrule to the portion where the flat surface 13 having the tapered configuration described above intersects the cylinder surface to be 0.2 mm or less to further reduce the Wiggle loss by increasing the length where the sleeve 7 holds the fiber stub 4.

FIG. 8 is a schematic cross-sectional view of an optical receptacle showing a seventh embodiment of the invention.

Figure 8A:
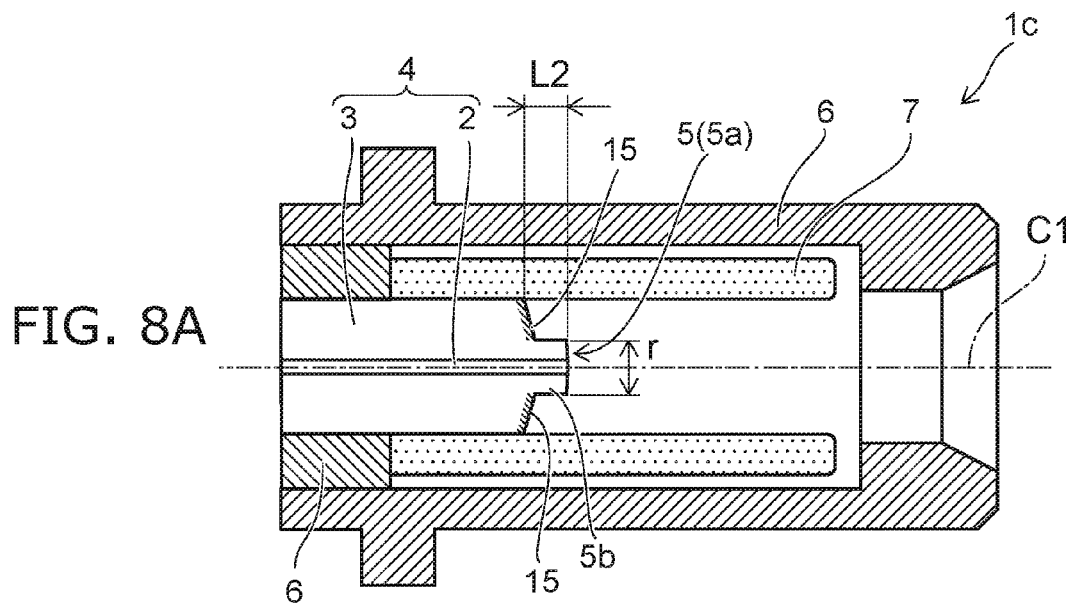
FIG. 8A and FIG. 8B are schematic cross-sectional views of an optical receptacle showing a seventh embodiment of the invention.
Figure 8B:
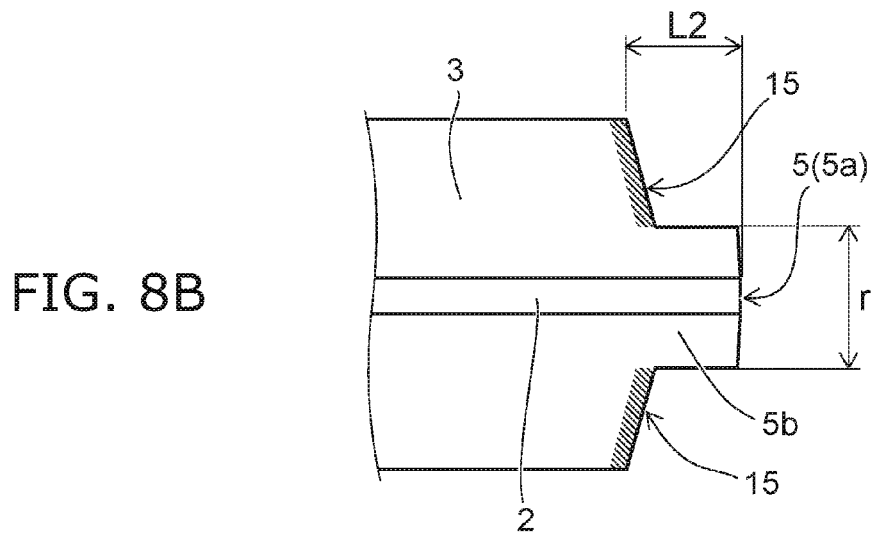

FIG. 8A is a schematic cross-sectional view showing the optical receptacle according to the embodiment. FIG. 8B is a schematic cross-sectional view showing the end surface of the fiber stub of the embodiment.

A protrusion (a second portion) 5b that includes the end surface 5 polished into the convex spherical configuration of the ferrule 3 to be connected to the plug ferrule protrudes from a tapered unit (foreign matter movement suppressor: first portion) 15. More specifically, the protrusion 5b that includes the end surface 5 polished into the convex spherical configuration of the ferrule 3 to be connected to the plug ferrule protrudes further toward the side of the ferrule 3 to be connected to the plug ferrule than does the tapered unit 15. Thereby, the loss due to the foreign matter that was adhered to the outer circumferential portion of the fiber stub 4 moving to the central portion 5a in the process of repeatedly inserting and removing the plug ferrule into and from the optical receptacle is can be prevented. In the embodiment, the end surface 5 of the fiber stub 4 is equivalent to the central portion 5a.

The surface roughness of the tapered unit 15 is set to be larger than the surface roughness of the protrusion 5b.

The average height Rc of the tapered unit 15 is 0.305 or more. More desirably, the average height Rc of the tapered unit 15 is not less than 0.305 and not more than 0.606.

The skewness (skewness) Rsk of the tapered unit 15 is −0.2 or less. More desirably, the skewness Rsk of the tapered unit 15 is −0.3 or less.

The average height Rc and the skewness Rsk are calculated based on JIS B 0601-2001. Details of more specific measurement methods of the average height Rc and the skewness Rsk are described below.

Also, it is desirable for a length L2 from the end surface 5 polished into the convex spherical configuration of the ferrule 3 to be connected to the plug ferrule to the portion where the flat surface (the tapered unit) 15 having the tapered configuration intersects the cylinder surface (the portion where the tapered unit 15 is connected to the protrusion 5b) to be 0.2 mm or less to further reduce the Wiggle loss by increasing the length where the sleeve 7 holds the fiber stub 4.

Here, similar effects are obtained even in the case where the flat surface 15 having the tapered configuration is set to be a surface perpendicular to a central axis C1 of the fiber stub 4 as in Reference Document 3. However, by providing the flat surface having the tapered configuration, the foreign matter can move more easily to the outside when cleaning the end surface 5 of the fiber stub 4 prior to inserting the plug ferrule; further, it is no longer necessary to newly provide a CH-surface for preventing the chipping and cracks of the ferrule 3 when pressing into the ferrule 3 into the holder 6; and it is possible to perform economic production.

It is desirable for the relationship "L2/r" between the length L2 and the outer diameter r of the end surface 5 protruding from the tapered unit 15 to be not less than 0.1 and not more than 0.6.

Other embodiments of the invention will now be described with reference to the drawings.

Figure 9:
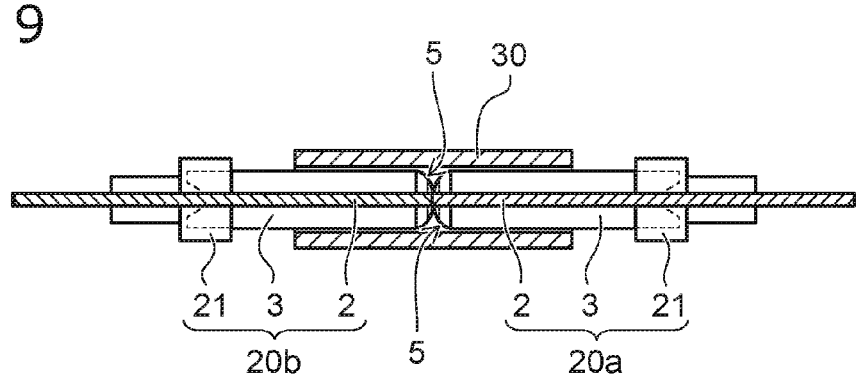
FIG. 9 is a schematic cross-sectional view showing the state in which multiple plug ferrules are connected to each other via a sleeve.

FIG. 9 is a schematic cross-sectional view showing the state in which multiple plug ferrules are connected to each other via a sleeve.

In optical communication, there are cases where multiple optical fiber connectors are connected to each other via an adapter or a sleeve without using an optical receptacle such as those described above in reference to FIG. 1 to FIG. 8. In the example shown in FIG. 9, a first plug ferrule 20a inside a first optical fiber connector is connected via a sleeve 30 to a second plug ferrule (one other member) 20b inside a second optical fiber connector. The first plug ferrule 20a is different from the second plug ferrule 20b.

The structure of the first plug ferrule 20a is similar to the structure of the second plug ferrule 20b. The first plug ferrule 20a will now be described as an example. The first plug ferrule 20a includes the optical fiber 2, the ferrule 3, and a flange 21. The optical fiber 2 conducts light. The ferrule 3 contains the optical fiber 2. The flange 21 is provided at the end portion of the ferrule 3 and contains at least a part of the ferrule 3.

The foreign matter movement suppressor that suppresses the foreign matter moving from the outer circumferential portion of the ferrule 3 toward the central portion of the ferrule 3 due to inserting and removing the plug ferrule is provided in the end surface 5 on the side where the multiple ferrules 3 are connected. More specifically, the foreign matter movement suppressor that suppresses the foreign matter moving from the outer circumferential portion of the ferrule 3 toward the central portion of the ferrule 3 due to inserting and removing at least one of the first plug ferrule 20a or the second plug ferrule 20b is provided in the end surface 5 of the ferrule 3 of the first plug ferrule 20a on the side to be connected to the second plug ferrule 20b. The foreign matter movement suppressor is provided similarly in the end surface 5 of the ferrule 3 of the second plug ferrule 20b on the side to be connected to the first plug ferrule 20a.

The end surface 5 of the ferrule 3 of the first plug ferrule 20a is polished into a convex spherical surface. In other words, the ferrule 3 of the first plug ferrule 20a has the end surface 5 polished into the convex spherical configuration on the side to be connected to the second plug ferrule 20b. The curvature radius R of the end surface 5 is, for example, about R7 to R25.

For example, as described above in reference to FIG. 1, the recess 8 that extends in the circumferential configuration for containing the foreign matter moving from the outer circumferential portion of the ferrule 3 toward the central portion of the ferrule 3 is provided in the end surface 5 of the ferrule 3.

For example, as described above in reference to FIG. 2A to FIG. 2D, the cross-sectional view of the recess 8 is a quadrilateral, a V-shape, a semicircle, or various configurations in which the width becomes finer toward the bottom surface.

For example, as described above in reference to FIG. 3, the recess 8 that extends in the circumferential configuration is made outside the region 9 (referring to FIG. 3) that may contact the second plug ferrule 20b when the first plug ferrule 20a is inserted into the sleeve 30.

For example, as described above in reference to FIG. 4, the surface roughness of the inner surface of the recess 8 is larger than the surface roughness of the region of the end surface 5 of the ferrule 3 other than the recess 8. The surface roughness of the inner surface of the recess 8 is as described above in reference to FIG. 4.

For example, as described above in reference to FIG. 5, the recesses (e.g., the first recess 81 and the second recess 82 shown in FIG. 5) that extend in multiple circumferential configurations are provided in the end surface 5 of the ferrule 3.

For example, as described above in reference to FIG. 6A and FIG. 6B, the outer unit 11 is provided in the end surface 5 of the ferrule 3 outside the central portion 5a polished into the convex spherical configuration (referring to FIG. 6B). The surface roughness of the outer unit 11 is set to be larger than the surface roughness of the central portion 5a to suppress the movement of the foreign matter moving from the outer circumferential portion side toward the central portion 5a.

For example, as described above in reference to FIG. 7A and FIG. 7B, the tapered unit 13 that extends from the central portion 5a polished into the convex spherical configuration (referring to FIG. 7B) to the outer circumferential portion of the ferrule 3 is provided in the end surface 5 of the ferrule 3. The surface roughness of the tapered unit 13 is set to be larger than the surface roughness of the central portion 5a to suppress movement of the foreign matter moving from the outer circumferential portion side toward the central portion 5a.

For example, as described above in reference to FIG. 8A and FIG. 8B, the protrusion 5b that includes the end surface 5 of the ferrule 3 protrudes from the tapered unit 15. More specifically, the protrusion 5b that includes the end surface 5 of the ferrule 3 of the first plug ferrule 20a protrudes toward the side where the ferrule 3 of the first plug ferrule 20a is to be connected to the ferrule 3 of the second plug ferrule 20b as viewed from the tapered unit 15.

The configuration and materials of the ferrule 3, the configuration and roughness of the end surface 5 of the ferrule 3, etc., are as described above in reference to FIG. 1 to FIG. 8B.

According to the embodiment, the loss occurring due to the foreign matter at the outer circumferential portion of the ferrule 3 moving to the central portion of the end surface 5 of the ferrule 3 when repeatedly inserting and removing at least one of the first plug ferrule 20a or the second plug ferrule 20b into and from the sleeve 30 can be prevented.

Investigations relating to the surface roughness implemented by the inventor will now be described with reference to the figures.

FIG. 10 is tables showing examples of the results of the investigations relating to the surface roughness implemented by the inventor.

FIG. 10A is a table showing the arithmetic average roughness Ra, the average height Rc, and the skewness Rsk of a processed surface (a rough surface). FIG. 10B is a table showing the arithmetic average roughness Ra, the average height Rc, and the skewness Rsk of an unprocessed surface. FIG. 10C is a table showing the arithmetic average roughness Ra, the average height Rc, and the skewness Rsk of a polished surface. FIG. 10D is a table showing the average values of the arithmetic average roughness Ra, the average height Rc, and the skewness Rsk for each of the processed surface, the unprocessed surface, and the polished surface.

The "processed surface (rough surface)" refers to a surface that is rougher than the surface of the central portion 5a polished into the convex spherical configuration. In the optical receptacle 1a described above in reference to FIG. 6, the processed surface is the surface of the outer unit 11. In the optical receptacle 1b described above in reference to FIG. 7, the processed surface is the surface of the tapered unit 13.

The "unprocessed surface" refers to a surface where surface processing or surface treatment is not performed.

The "polished surface" refers to a polished surface. In the optical receptacle 1a described above in reference to FIG. 6, the polished surface is the surface of the central portion 5a having the convex spherical configuration. In the optical receptacle 1b described above in reference to FIG. 7, the polished surface is the end surface 5 (equivalent to the central portion 5a in the example of FIG. 7).

Five samples were measured for the processed surface as shown in FIG. 10A. Five samples were measured for the unprocessed surface as shown in FIG. 10B. Two samples were measured for the polished surface.

The arithmetic average roughness Ra, the average height Rc, and the skewness Rsk are calculated based on JIS B 0601-2001.

In the embodiment, the roughness curve of the end surface of the ferrule 3 was measured using the following conditions.

Measurement device: laser microscope (OLS 4000 manufactured by Olympus)
Measurement magnification: 50 times
Cut-off (phase compensation high-pass filter) λc: 25 μm From the roughness curve measured using the conditions recited above, the arithmetic average roughness Ra is determined by the following formula (1); the average height Rc is determined by the following formula (2); and the skewness Rsk is determined by the following formula (3).

[Formula 1]

$$Ra = \frac{1}{\ell} \int_0^\ell |Z(x)| dx \quad (1)$$

[Formula 2]

$$Rc = \frac{1}{m} \sum_{i=1}^{m} Zti \quad (2)$$

[Formula 3]

$$Rsk = \frac{1}{Zq^3} \left[ \frac{1}{N} \sum_{n=1}^{N} Zn^3 \right] \quad (3)$$

In formula (2), m is the number of outline curve components, and Zti is the average value of the heights of the outline curve components.

In formula (3), Zq is the root mean square height, and Zn is the value of the height of the roughness curve.

The skewness Rsk shows the symmetry between the hills (the convexities) and the dales (the concavities) of the uneven configuration. The skewness Rsk is 0 if the uneven configuration has a sinusoidal distribution. A negative skewness Rsk shows that the surface area of the hills (the convexities) is greater than the surface area of the dales (the concavities) (the sharpness of the protrusions is less than the sharpness of the recesses) when viewed in a direction perpendicular to the end surface of the ferrule 3.

As shown in FIG. 10A, the arithmetic average roughness Ra of the processed surface is not less than 0.130 and not more than 0.192. The average value of the arithmetic average roughness Ra of the processed surface is 0.166. The average height Rc of the processed surface is not less than 0.305 and not more than 0.606. The average value of the average height Rc of the processed surface is 0.489. The skewness Rsk of the processed surface is not less than −0.355 and not more than −0.198. The average value of the skewness Rsk of the processed surface is −0.268.

The foreign matter countermeasure effect for the processed surface is OK (○) for all of the samples.

For the "foreign matter countermeasure effect," the inserting and removing of the plug ferrule into and from the optical receptacle was performed repeatedly; and the adhesion of the foreign matter on the polished surface was confirmed every five times of inserting and removing. The foreign matter countermeasure effect was "OK (○)" when the inserting and removing of the plug ferrule into and from the optical receptacle was repeated 25 times and the foreign matter count adhered on the polished surface was three or less. On the other hand, the foreign matter countermeasure effect was "NG (×)" when the foreign matter count adhered on the polished surface was four or more.

As shown in FIG. 10B, the arithmetic average roughness Ra of the unprocessed surface is not less than 0.020 and not more than 0.201. The average value of the arithmetic average roughness Ra of the unprocessed surface is 0.124. The average height Rc of the unprocessed surface is not less than 0.047 and not more than 0.072. The average value of the average height Rc of the unprocessed surface is 0.061. The skewness Rsk of the unprocessed surface is not less than −0.182 and not more than 0.183. The average value of the skewness Rsk of the unprocessed surface is −0.021. The foreign matter countermeasure effect for the unprocessed surface is NG (×) for all of the samples.

As shown in FIG. 10C, the arithmetic average roughness Ra of the polished surface is not less than 0.002 and not more than 0.004. The average value of the arithmetic average roughness Ra of the polished surface is 0.003. The average height Rc of the polished surface is not less than 0.008 and not more than 0.009. The average value of the average height Rc of the polished surface is 0.0085. The skewness Rsk of the polished surface is not less than 0.532 and not more than 0.954. The average value of the skewness Rsk of the polished surface is 0.743.

Thereby, in the case where the average height Rc is relatively large, the height of the hills and dales existing in the surface is large; and the foreign matter snags easily on a hill or a dale. Therefore, in the case where the average height Rc is relatively large, the foreign matter can be impeded from moving to the central portion 5a.

Also, in the case where the skewness Rsk is relatively small, the flat surface is hill-rich (the state in which dales having relatively narrow widths exist between hills having relatively wide widths); and the contact surface area between the foreign matter and the surface is relatively wide. Therefore, in the case where the skewness Rsk is relatively small, the foreign matter can be impeded from moving to the central portion 5a.

Figure 11:
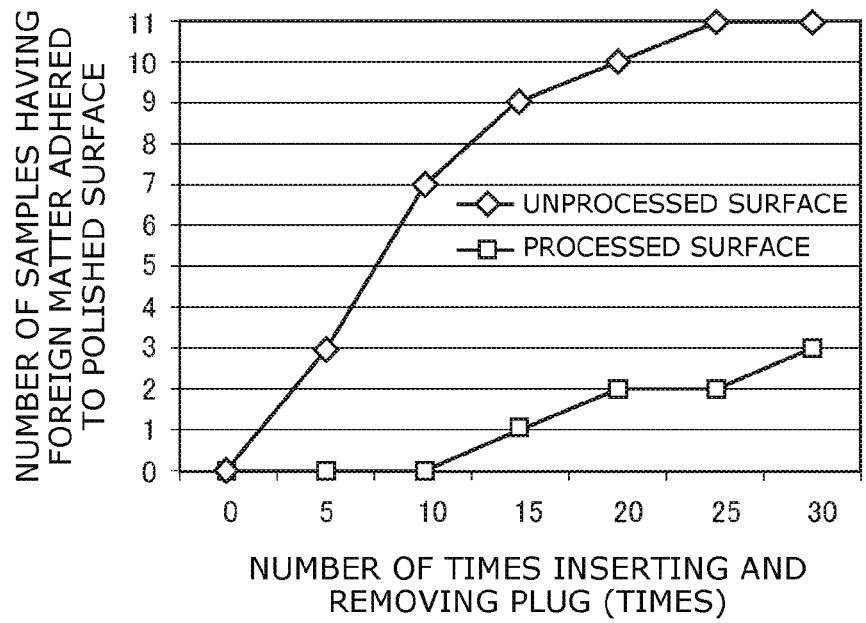
FIG. 11 is a graph showing another example of the results of the investigations relating to the surface roughness implemented by the inventor.

FIG. 11 is a graph showing another example of the results of the investigations relating to the surface roughness implemented by the inventor.

The inventor performed an investigation relating to the surface roughness using an optical receptacle including the ferrule 3 having a processed surface and an optical receptacle including the ferrule 3 having an unprocessed surface. The "processed surface" of the investigation is a surface on which surface processing is performed using a diamond grindstone after forming the ferrule 3. The "unprocessed surface" of the investigation is a surface as-is in the state formed after forming the ferrule 3.

The investigation method is as follows. First, cleaning of both the optical receptacle and the plug ferrule is performed sufficiently; and the inserting and removing of the plug ferrule into and from the optical receptacle is performed repeatedly. Continuing, the adhesion of the foreign matter on the polished surface is confirmed every five times of inserting and removing; and the inserting and removing of the plug ferrule into and from the optical receptacle is repeated 30 times. However, the inserting and removing of the plug ferrule is discontinued at the point in time when the adhesion of the foreign matter on the polished surface is confirmed. Five samples were measured for the optical receptacle including the ferrule 3 having the processed surface. Five samples were measured for the optical receptacle including the ferrule 3 having the unprocessed surface. The number of samples is based on "Telcordia standards."

An example of the investigation results is as shown in FIG. 11. The horizontal axis of the graph shown in FIG. 11 is the number of times of inserting and removing of the plug ferrule when the adhesion of the foreign matter on the polished surface is confirmed. The vertical axis of the graph shown in FIG. 11 is the number of samples (the cumulative number) having the foreign matter adhered on the polished surface. As shown in FIG. 11, for the optical receptacle including the ferrule 3 having the processed surface, the number of samples having the foreign matter adhered on the polished surface at the point in time when the inserting and removing of the plug ferrule is repeated 25 times was "3." On the other hand, for the optical receptacle including the ferrule 3 having the unprocessed surface, the number of samples having the foreign matter adhered on the polished surface at the point in time when the inserting and removing of the plug ferrule is repeated 10 times was "7."

In the investigation, the foreign matter countermeasure effect was "OK (○)" in the case where the number of times of inserting and removing of the plug ferrule when the foreign matter was adhered on the polished surface was within 25 times and the number of samples having the foreign matter adhered on the polished surface was three or less. On the other hand, the foreign matter countermeasure effect was "NG (×)" in the case where the number of samples having the foreign matter adhered on the polished surface was four or more. "25 times" is based on the "Telcordia standards."

Thereby, the foreign matter countermeasure effect of the optical receptacle including the ferrule 3 having the processed surface is OK (○). On the other hand, the foreign matter countermeasure effect of the optical receptacle including the ferrule 3 having the unprocessed surface is NG (×).

FIG. 12 is a schematic view showing a sample used in an investigation relating to the recess (the trench) implemented by the inventor.

Figures 13, 14:
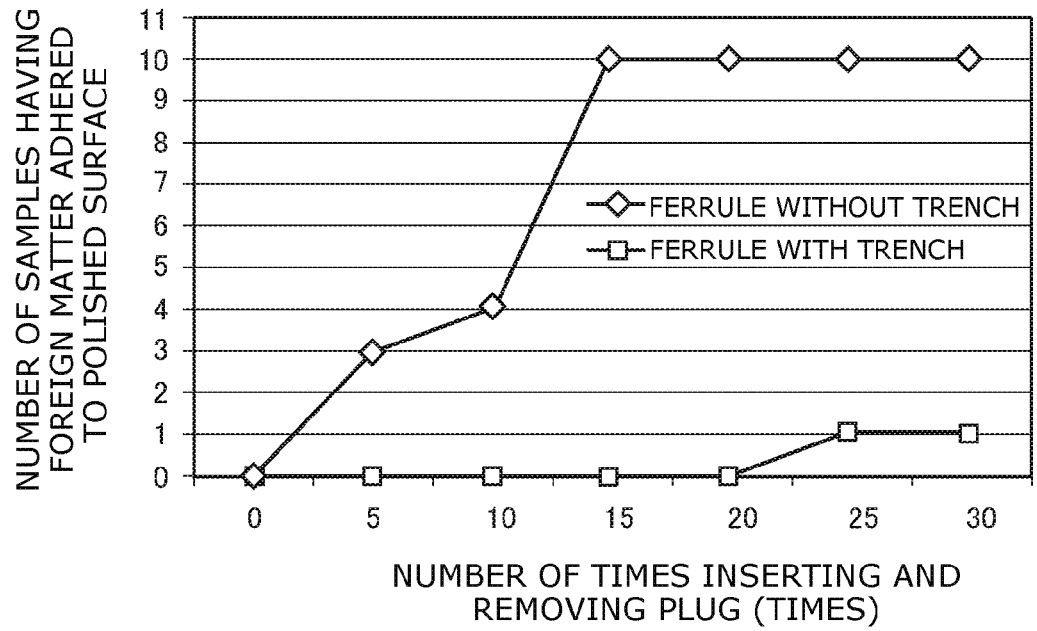
FIG. 13 is a graph showing an example of the results of the investigation relating to the recess (the trench) implemented by the inventor.
FIG. 14 is a table showing an example of the results of the investigation relating to the surface roughness of the inner surface of the recess (the trench) implemented by the inventor.

FIG. 13 is a graph showing an example of the results of the investigation relating to the recess (the trench) implemented by the inventor.

Figures 12A, 12B:
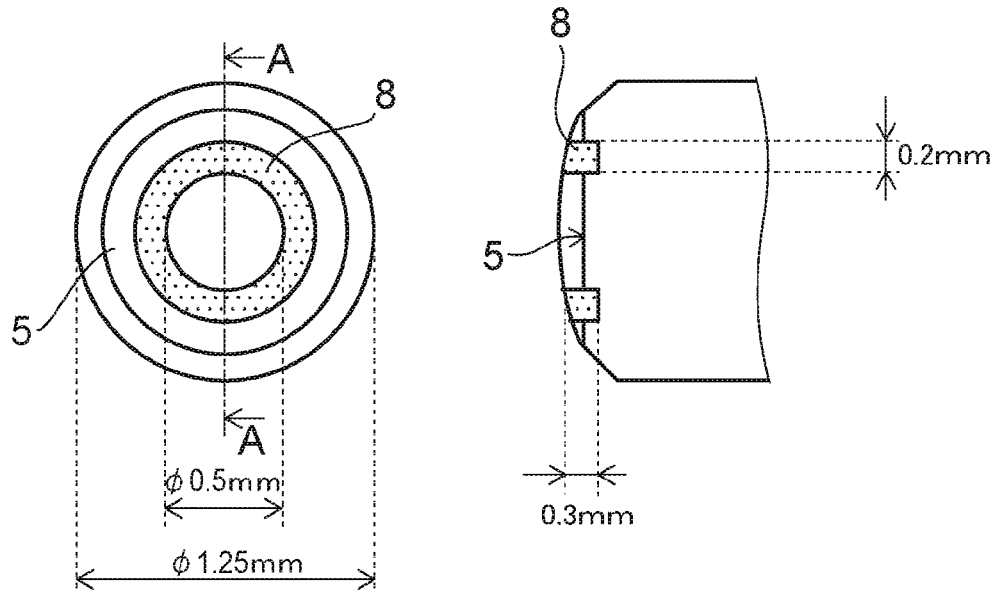
FIG. 12A and FIG. 12B are schematic views showing a sample used in an investigation relating to the recess (the trench) implemented by the inventor.

FIG. 12A is a schematic plan view showing the samples used in the investigation relating to the recess (the trench). FIG. 12B is a schematic cross-sectional view along cross-section A-A shown in FIG. 12A.

The inventor performed an investigation relating to the recess using an optical receptacle including the ferrule 3 having the recess 8 (referring to FIG. 1) and an optical receptacle including the ferrule 3 not having the recess 8. The ferrule 3 that does not have the recess 8 is the ferrule as-is in the state after forming. The ferrule 3 that has the recess 8 is as shown in FIG. 12A and FIG. 12B. The recess 8 is formed by processing using a grindstone.

The investigation method is the same as the investigation method described above in reference to FIG. 11.

An example of the investigation results is as shown in FIG. 13. The horizontal axis of the graph shown in FIG. 13 is the same as the horizontal axis of the graph shown in FIG. 11. The vertical axis of the graph shown in FIG. 13 is the same as the vertical axis of the graph shown in FIG. 11. As shown in FIG. 13, for the optical receptacle including the ferrule 3 having the recess 8, the number of samples having the foreign matter adhered on the polished surface at the point in time when the inserting and removing of the plug ferrule is repeated 25 times was "1." On the other hand, for the optical receptacle including the ferrule 3 not having the recess 8, the number of samples having the foreign matter adhered on the polished surface at the point in time when the inserting and removing of the plug ferrule is repeated 5 times was "3."

The evaluation method of the foreign matter countermeasure effect is the same as the evaluation method described above in reference to FIG. 11.

Thereby, the foreign matter countermeasure effect of the optical receptacle including the ferrule 3 having the recess 8 is OK (○). On the other hand, the foreign matter countermeasure effect of the optical receptacle including the ferrule 3 not having the recess 8 is NG (×).

FIG. 14 is a table showing an example of the results of the investigation relating to the surface roughness of the inner surface of the recess (the trench) implemented by the inventor.

For example, the inventor performed the investigation for the surface roughness of the inner surface of the recess 8 shown in FIG. 4. More specifically, the inventor performed the investigation for the processability of the inner surface of the recess 8 in the case where the arithmetic average roughness of the inner surface of the recess 8 is 0.2, 0.4, 0.8, 1.6, 3.2, 4.8, and 6.4 micrometers.

An example of the investigation results is as shown in FIG. 14. In the case where the arithmetic average roughness of the inner surface of the recess 8 is 0.2 and 0.4 micrometers, there is room for improvement for performing economic production of the ferrule 3 because the number of processing to make the surface smoother increases. Therefore, the processability in the case where the arithmetic average roughness of the inner surface of the recess 8 is 0.2 and 0.4 micrometers is NG (× or △).

In the case where the arithmetic average roughness of the inner surface of the recess 8 is 0.8, 1.6, and 3.2 micrometers, the productivity of the ferrule 3 is relatively high. Also, the occurrence of cracks, etc., in the ferrule 3 can be suppressed. Therefore, the processability in the case where the arithmetic average roughness of the inner surface of the recess 8 is 0.8, 1.6, and 3.2 micrometers is OK (○).

In the case where the arithmetic average roughness of the inner surface of the recess 8 is 4.8 and 6.4 micrometers, there is a possibility that cracks may occur when processing the recess 8 because the surface is relatively rough. Therefore, the processability in the case where the arithmetic average roughness of the inner surface of the recess 8 is 4.8 and 6.4 micrometers is NG (×).

Thereby, it is desirable for the arithmetic average roughness (Ra) of the inner surface of the recess 8 to be not less than 0.8 micrometers and not more than 3.2 micrometers.

The embodiments of the invention have been described above. However, the invention is not limited to the above description. Those skilled in the art can appropriately modify the above embodiments, and such modifications are also encompassed within the scope of the invention as long as they include the features of the invention. For instance, the shape, dimension, material, arrangement and the like of various components in the fiber stub 4 and the like, and the installation configuration and the like of the ferrule 3 and the optical fiber 2 are not limited to those illustrated, but can be modified appropriately.

Furthermore, various components in the above embodiments can be combined with each other as long as technically feasible. Such combinations are also encompassed within the scope of the invention as long as they include the features of the invention.

INDUSTRIAL APPLICABILITY

According to an embodiment of the invention, an optical receptacle is provided in which the loss occurring due to the foreign matter at the fiber stub outer circumferential portion moving to the central portion of the fiber stub end surface when repeatedly inserting and removing the plug ferrule into and from the optical receptacle can be prevented; and the Wiggle loss can be reduced by maintaining the length where the sleeve holds the fiber stub.

REFERENCE NUMERAL LIST 1, 1a, 1b, 1c optical receptacle
2 optical fiber
3 ferrule
4 fiber stub
5 end surface
5a central portion
6 holder
7 sleeve
8 recess
8a unevenness
9 region
11 outer unit
13, 15 tapered unit
81 first recess
82 second recess

The invention claimed is:

1. A ferrule for being optically connected to one other member via an optical receptacle into which the ferrule may be inserted and removed, the ferrule comprising:
   an optical fiber which conducts light, and
   a foreign matter movement suppressor provided in an end surface of the ferrule which suppresses movement of foreign matter due to inserting and removing the ferrule, wherein
   the end surface is polished into a convex spherical configuration on an end thereof which extends from a tapered outer circumferential portion of the ferrule and is configured to be to be connected to the one other member,
   the foreign matter movement suppressor suppressing movement of foreign matter moving-from an outer circumferential portion of the ferrule toward a central portion of the end surface,
   the foreign matter movement suppressor including a recess provided in the end of the end surface having the convex spherical configuration, the recess extending in a circumferential configuration,
   an arithmetic average roughness of an inner surface of the recess being not less than 0.8 micrometers and not more than 3.2 micrometers.

2. The ferrule according to claim 1, wherein the recess is outside a portion of the end surface configured to contact the one other member.

3. The ferrule according to claim 1, wherein the recess is multiply provided in the end surface.

4. The ferrule according to claim 1, wherein the surface roughness of the inner surface of the recess is larger than a surface roughness of a region of the ferrule other than the recess.

5. The ferrule according to claim 4, wherein the region of the ferrule other than the recess is a region in the end surface.

6. The ferrule according to claim 1, wherein
   the foreign matter movement suppressor includes a first portion of the end surface not directly contacting the one other member, and
   an average height of a surface of the first portion is 0.305 or more, and a skewness of the surface of the first portion is −0.2 or less.

7. The ferrule according to claim 6, wherein at least a part of the first portion has a tapered configuration extending to an outer circumferential portion of the one other member.

8. The ferrule according to claim 6, wherein a second portion of the end surface protrudes further toward the side to be connected to the one other member than does the first portion, the second portion directly contacting the one other member.

9. The ferrule according to claim 1, wherein the ferrule is a plug ferrule and further comprises a flange containing at least a part of the ferrule.

* * * * *